United States Patent
Lin

(10) Patent No.: US 7,480,453 B2
(45) Date of Patent: Jan. 20, 2009

(54) CAMERA MODULE WITH POSITION DETECTING MECHANISM

(75) Inventor: Jhy-Chain Lin, Tu-cheng (TW)

(73) Assignee: Hon Hai Precision Industry Co., Ltd., Tu-Cheng, Taipei Hsien (JP)

( * ) Notice: Subject to any disclaimer, the term of this patent is extended or adjusted under 35 U.S.C. 154(b) by 343 days.

(21) Appl. No.: 11/438,007

(22) Filed: May 19, 2006

(65) Prior Publication Data

US 2007/0069105 A1    Mar. 29, 2007

(51) Int. Cl.
*G03B 17/00* (2006.01)

(52) U.S. Cl. ......................................... 396/87; 396/205

(58) Field of Classification Search ................ 396/85, 396/87, 205; 348/208.1–208.8, 208.11; 324/715–716
See application file for complete search history.

(56) References Cited

U.S. PATENT DOCUMENTS 5,628,035 A * 5/1997 Nakazawa ................ 396/87
6,924,940 B2 * 8/2005 Koga et al. ................ 359/694
2006/0077281 A1 * 4/2006 Hasegawa ................ 348/360

* cited by examiner

*Primary Examiner*—Bot LeDynh

(57) ABSTRACT

An exemplary camera module includes a lens holder (10), a lens module (20), a position detecting mechanism (30), and an image pick-up module (40). The lens module includes a lens barrel (22) and one lens received in the lens barrel. The lens barrel is axially movable received in the lens holder. The position detecting mechanism includes a conductive strip (32) disposed on outer periphery of the lens barrel along an axial direction, a number of conductive terminals (36), a number of electrical sources (34), and a processor (38). The conductive terminals are securely arranged on an inner periphery of the lens holder parallel to each other. A cathode of each electrical source is electrically connected to a corresponding conductive terminal. The processor is electrically connected with an anode of each electrical source. The image pick-up module is arranged so as to receive the light from the lens module.

16 Claims, 2 Drawing Sheets

CAMERA MODULE WITH POSITION DETECTING MECHANISM

This application claims foreign priority based on Chinese Patent Application No. 200510037481.4, filed Sep. 23, 2005, the content of which is incorporated herein by reference in its entirety.

TECHNICAL FIELD

The present invention relates generally to camera modules and, more particularly, to a camera module which can detect lens module position in real-time.

BACKGROUND

There are many camera modules with auto-focusing function or vari-focus lenses built into cameras and camcorders. For camera modules with an auto-focusing function, the camera lens projects an image onto an image sensor, an AF module retrieves a portion of the image for a CPU to process the contrast information, the CPU then activates an auto-focus motor to move the lens into focus. This process is repeated until the object is accurately focused on. For camera modules with vari-focus lenses, the camera module generally includes at least two lens modules received in a lens holder. One of the two lens modules is driven to move back and forth to change a distance between the two lens modules so as to vary the focal length of the camera module.

The lens module may move back and forth a distance in the camera module in the above-described camera modules. To precisely control the movement of the lens module in the camera module, it is necessary to detect a position of the lens module in the camera module. Nowadays, it is common for a lens module system to evaluate a movement value for the lens module, and then for the lens module to be driven to travel through this movement value by a step motor. However, since the moving of the lens module is not monitored in real-time, the moving of the lens module cannot be precisely controlled. The result being that there is a difference between desired movement and real movement, and therefore there may be cases where a required focus cannot be achieved properly.

What is needed, therefore, is a camera module which overcomes the above-described problems.

SUMMARY OF THE INVENTION

A camera module comprise a lens holder, a lens module, a position detecting mechanism, and an image pick-up module. The lens module includes a lens barrel and at least one lens received in the lens barrel. The lens barrel is axially movably received in the lens holder for transmitting light outside the camera module therethrough. The position detecting mechanism comprises a conductive strip disposed on an outer periphery of the lens barrel along an axial direction, a plurality of conductive terminals, a plurality of electrical sources, and a processor. The conductive terminals are securely arranged on an inner periphery of the lens holder parallel to each other for separately connecting with the conductive strip. A cathode of each electrical source is electrically connected to a corresponding conductive terminal. The processor is electrically connected with an anode of each electrical source for detecting the position of the lens module. The image pick-up module is arranged so as to receive the light from the lens module.

Other advantages and novel features will become more apparent from the following detailed description when taken in conjunction with the accompanying drawings.

BRIEF DESCRIPTION OF THE DRAWINGS

Many aspects of the camera module with a position detecting mechanism can be better understood with reference to the following drawings. The components in the drawings are not necessarily drawn to scale, the emphasis instead being placed upon clearly illustrating the principles of the present camera module with a position detecting mechanism. Moreover, in the drawings, like reference numerals designate corresponding parts throughout the several views.

DETAILED DESCRIPTION OF PREFERRED EMBODIMENTS

Figure 1:
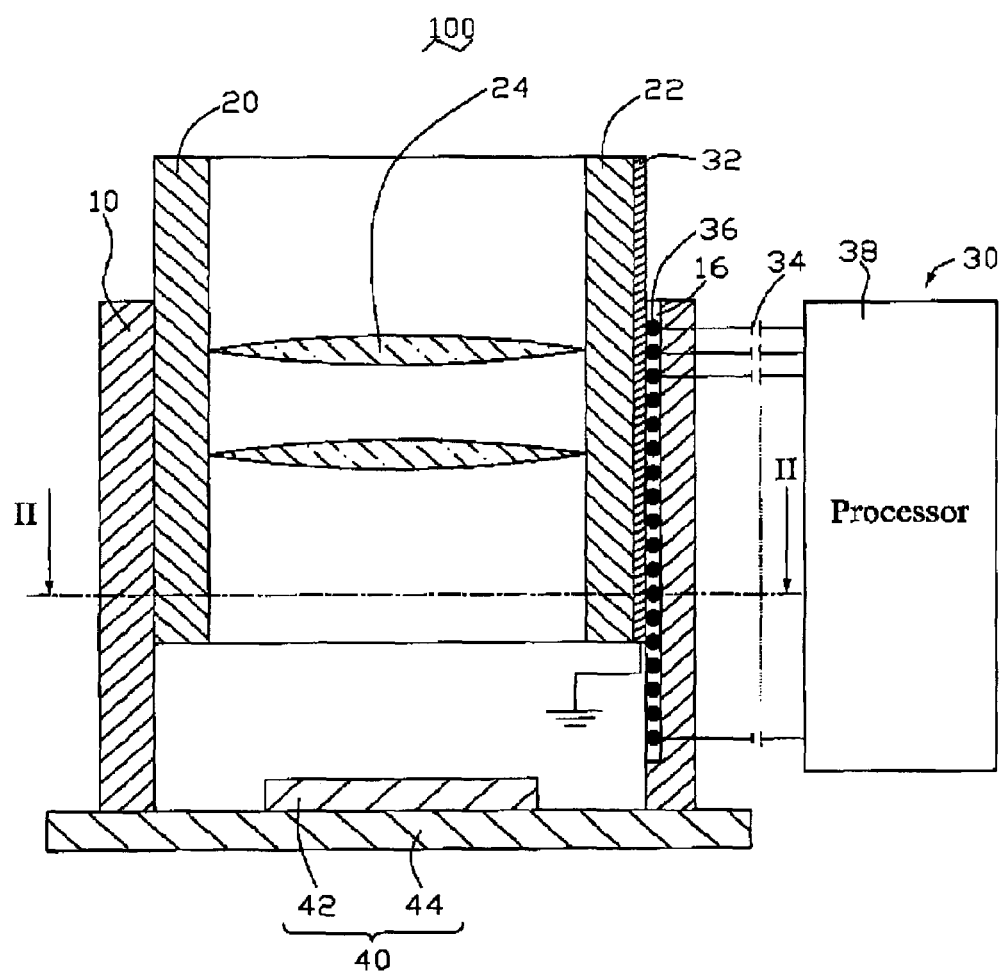
FIG. 1 is an schematic view of a camera module with a focus detection mechanism, in accordance with a first preferred embodiment.
Figure 2:
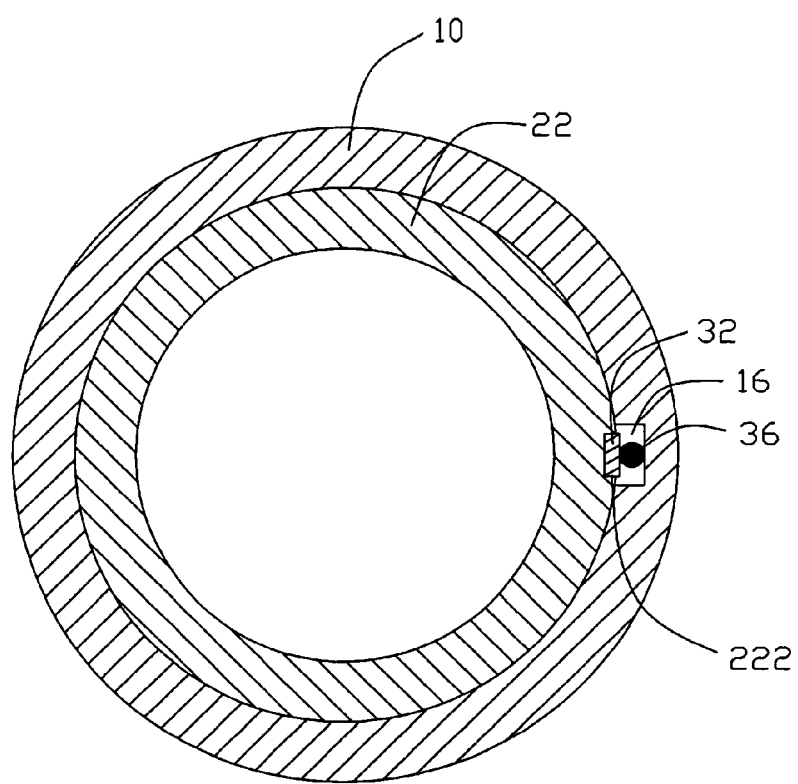
FIG. 2 is an sectional view taken along II-II line of FIG. 1.

Referring now to the drawings, FIG. 1 shows a camera module 100 according to one embodiment. The camera module 100 is adapted for use in a portable electronic device (not shown), such as a mobile phone or a personal digital assistant (PDA), but the compact nature thereof could prove useful in compact digital camera units or digital camcorders as well. The camera module 100 includes a lens holder 10, a lens module 20, a position detecting mechanism 30, and an image pickup sensor 40. The lens module 20 is mounted in the lens holder 10 and can be moved towards or away from the image pickup module 40 in lens holder 10.

The lens holder 10 is a hollow cylinder with two open ends (not labelled) allowing light beams to be transmitted therethrough. The lens holder 10 defines a receiving cavity (not labeled) inside. The lens holder 10 has a slot 16 as a recessed portion axially defined in an inner periphery thereof.

The lens module 20 includes a lens barrel 22 and a lens group 24 including a plurality of lenses received in the lens barrel 22. The lens barrel 22 is a hollow cylinder with two open ends so that light beams associated with the image being received can be transmitted therethrough. An outer diameter of the lens barrel 22 is equal to or slightly greater than an inner diameter of the lens holder 10. The lens barrel 22 is placed in and engages with the lens holder 10. The lens module 20 is axially located in the receiving cavity of the holder 10. The lens module 20 is capable of moving axially in the lens holder 10. It can be seen that an internal thread can be defined in the inner periphery of the lens holder 10, and an external thread can be defined in the outer periphery of the lens barrel 22. The lens module 20 can move axially in the lens holder 10 under thread engagement of the inner external thread with the outer external thread. The lens barrel 22 has a groove 222 defined in the outer periphery thereof and axially extending from one open end thereof to another open end thereof.

The position detecting mechanism 30 includes a conductive strip 32, a plurality of electrical sources 34, a plurality of conductive terminals 36, and a processor 38. A configuration of the conductive strip 32 corresponds to a configuration of the groove 222 of the lens barrel 22, and received in the groove 222. One end of the strip 32 connects to earth. The plurality of conductive terminals 36 are arranged in the slot 16 of the lens holder 10 in parallel along an axial direction and evenly spaced from each other in a manner such that each conductive terminal 36 can separately contact the conductive strip 32.

The plurality of electrical sources 34 separately and electrically connect with a respective conductive terminal 36. A cathode of each electrical source 34 electrically connects with the conductive terminal 36, and an anode of each electrical source 34 electrically connects with an input terminal of the processor 36. Thus, there is a potential difference between each conductive terminal 36 and the input terminal of the processor 38.

The processor 38 has an encoder therein. The processor determines the potential difference value between each conductive terminal 36 and the input terminal of the processor 38, which is associated with the movement of the lens module 20 to detect the position of the lens module 20 received in the lens holder 10. The processor 38 processes the potential difference value, and thus the encoder displays a series of different code, corresponding to different positions of the lens module 20.

The image pick-up module 40 includes a image pick-up sensor 42, a printed circuit board 44. The image pick-up sensor 42 can, for example, be a Complementary Metal-Oxide Semiconductor (CMOS) type sensor or a Charge Coupled Device (CCD). The image pick-up sensor 42 is electrically connected with the printed circuit board 44. The image pick-up sensor 42 is disposed on the center of the printed circuit board 44. The image pick-up sensor 42 aligns with the open end of the lens barrel 22 and the lens holder 10 in a manner such that the lens holder 10 and the lens barrel 22 is capable of routing the input light beams corresponding to an image being photographed to the image sensor 42. The printed circuit board 44 can be an electrically connected signal processing unit (not labelled) so that an image signal can be produced.

In assembling the camera module 100, the conductive strip 32 and the conductive terminal 36 is secured in the groove 222 of the lens barrel 22, with the conductive strip 32 connecting to the earth. The conductive terminals 36 are secured in the groove 16 of the lens holder 10, with each conductive terminal 36 electrically connecting with an electrical source 34 and contacting the conductive strip 32. Then, the lens holder 10 is fixed on the print circuit board 44 of the image pick-up module 40 by glue or another adhesive, with the image pick-up sensor 42 aligning with the open end of the lens holder 10 to receive a light signal thereupon. Then, the lens module 20 is axially located into the lens holder 10, and engaged with the lens holder 10. Lastly, the anode of each electrical source 34 electrically connects with the input terminal of the processor 38.

In use, the camera module 100 is installed within a portable electronic device (not shown), such as mobile phone. The processor 38 is electrically connected with a power source such as a battery of the portable electronic device, in order to capture electrical power. When the camera module 100 needs to AF, the lens module 20 is driven by an actuator, such as a step motor integrated in the electronic portable device, to axially move in the lens holder 10. During movement of the lens barrel 22 in the lens holder 10, when the conductive terminal 36 does not contact the conductive strip 32, the conductive terminal 36 is floating. The processor 38 analyzes and produces a logic level "0" corresponding to this conductive terminal 36. When the conductive terminal 36 contacts the conductive strip 32, there is potential difference between the conductive terminal 36 and the input terminal of the processor 38, thus a positive voltage is produced. The processor 38 analyzes the potential difference and produces a logic level "1". The encoder in the processor 38 synthesizes all individual logic levels corresponding to all the conductive terminals 36 into code and outputs the code, which corresponds to a position of the lens module 20 in the lens holder 10. During movement of the lens barrel 22, the encoder in the processor 38 encodes a series of different code, corresponding to different positions of the lens module 20. A user can detect the real-time movement position and movement value of the lens module 20 according to the output coding from the encoder of the processor 38. Judged by the output signal, if the actual movement amount of the lens module 20 is unequal to the target movement amount by which the lens module 20 should move, a controlling unit in the portable electronic device triggers the actuator to continually drive the lens module 20 until the actual movement amount of the lens module 20 is equal to the target movement amount.

In an alternative embodiment, the conductive strip 32 can be integrally formed with the lens barrel 22, therefore becoming an integral part of the lens barrel 22. Also, an outer peripheral portion of the lens barrel 22 can be made of conductive material such as metal such that a continuous conductive portion is formed on the lens barrel 22, and the conductive strip 32 can be omitted. The processor 38 may be an identify circuit for identifying those conductive terminals that are electrically contacting the conductive portion thereby detecting the position of the lens barrel relative to the lens holder.

It can be understood that a plurality of lens module is adopted. When the lens module 20 moves axially relative the lens holder 10 and other lens module, the focus length of the camera module can be changed. Also, the change of the focus length of the camera module can be detected in real-time by means of real-time detecting the position of the lens module 20 from the processor 38.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A camera module, comprising:
   a lens holder;
   a lens module including a lens barrel and at least one lens received in the lens barrel, the lens barrel being axially movably received in the lens holder for transmitting light from outside the camera module therethrough;
   a position detecting mechanism comprising:
      a conductive strip disposed on an outer periphery of the lens barrel along an axial direction thereof;
      a plurality of conductive terminals arranged on an inner periphery of the lens holder parallel to each other for separately connecting with the conductive strip;
      a plurality of electrical sources, each of the electrical sources comprising a cathode and an anode, the cathode being electrically connected to one corresponding conductive terminal; and
      a processor electrically connected with the anode of the electrical source for detecting a potential difference between each conductive terminal and an input terminal of the processor associated with movement of the lens module; and
   an image pick-up module being arranged so as to receive the light from the lens module.

2. The camera module as claimed in claim 1, wherein the lens holder has a recessed portion axially defined in an inner periphery thereof, the conductive terminals are received in the recessed portion.

3. The camera module as claimed in claim 2, wherein the recessed portion is a slot.

4. The camera module as claimed in claim 1, wherein the lens barrel has a groove axially defined in outer periphery thereof, the conductive strip securely received in the groove.

5. The camera module as claimed in claim 1, wherein the conductive strip is integrally formed with the lens barrel.

6. The camera module as claimed in claim 1, wherein the lens holder has internal thread defined in an peripheral wall thereof, the lens barrel has external thread defined in an outer peripheral wall thereof, the external thread thereof being configured for movable engagement with the internal thread of the lens holder.

7. The camera module as claimed in claim 1, wherein the image pick-up module includes an image pick-up sensor and a printed circuit board, and the image pick-up sensor is electrically connected with the printed circuit board.

8. A camera module, comprising:
a lens holder;
a lens module including a lens barrel and at least one lens received in the lens barrel, the lens barrel axially movably received in the lens holder for transmitting light from outside the camera module therethrough, at least an outer peripheral portion of the lens barrel being made of conductive material;
a position detecting mechanism comprising:
    a plurality of conductive terminals securely arranged on an inner periphery of the lens holder parallel to each other for separately connecting with the lens barrel;
    a plurality of electrical sources, each of the electrical sources comprising a cathode and an anode, the cathode being electrically connected with a respective one of the conductive terminals; and
    a processor electrically connected with the anode of each electrical source for detecting a potential difference between each conductive terminal and an input terminal of the processor associated with movement of the lens module; and
an image pick-up module being arranged so as to receive the light from the lens module.

9. The camera module as claimed in claim 8, wherein the lens holder has internal thread defined in peripheral wall thereof, the lens barrel has external thread defined in outer peripheral wall thereof, the external thread thereof being configured for movable engagement with the internal thread of the lens holder.

10. The camera module as claimed in claim 8, wherein the image pick-up module includes an image pick-up sensor and a printed circuit board, and the image pick-up sensor is electrically connected with the printed circuit board.

11. The camera module as claimed in claim 8, wherein the lens holder has a recessed portion axially defined in an inner periphery thereof, the plurality of the conductive terminal is received in the recessed portion.

12. The camera module as claimed in claim 11, wherein the recessed portion is a slot.

13. A camera module, comprising:
a lens holder;
a lens module including a lens barrel with a lens received therein, the lens barrel being axially movably received in the lens holder for transmitting light from outside the camera module therethrough;
a continuous conductive portion formed on one of the lens barrel and the lens holder;
a plurality of separate conductive terminals arranged on the other of the lens barrel and the lens holder, the conductive terminals being configured for separately, slidingly, and electrically contacting the conductive portion upon movement of the lens barrel relative to the lens holder;
an identify circuit configured for identifying those conductive terminals that are electrically contacting the conductive portion thereby detecting the position of the lens barrel relative to the lens holder.

14. The camera module as claimed in claim 13, wherein the continuous conductive portion comprises a conductive strip attached to an outer periphery of the lens barrel.

15. The camera module as claimed in claim 13, wherein the continuous conductive portion is integrally formed on an outer periphery of the lens barrel.

16. The camera module as claimed in claim 13, wherein identify circuit is a processor.

* * * * *